US009634438B2

(12) United States Patent
Chaumeny et al.

(10) Patent No.: US 9,634,438 B2
(45) Date of Patent: Apr. 25, 2017

(54) ELECTRICAL APPARATUS COMPRISING A TEMPERATURE SENSOR HOUSED IN A SUPPORT ELEMENT

(71) Applicants: Legrand France, Limoges (FR);
Legrand SNC, Limoges (FR)

(72) Inventors: Jean-Luc Chaumeny, Solignac (FR);
Vincent Valadas, Ambazac (FR);
Romain Normand, Limoges (FR)

(73) Assignees: LEGRAND FRANCE, Limoges (FR);
LEGRAND SNC, Limoges (FR)

( * ) Notice: Subject to any disclaimer, the term of this patent is extended or adjusted under 35 U.S.C. 154(b) by 0 days.

(21) Appl. No.: 14/889,862

(22) PCT Filed: May 21, 2014

(86) PCT No.: PCT/FR2014/051198
§ 371 (c)(1),
(2) Date: Nov. 9, 2015

(87) PCT Pub. No.: WO2014/188130
PCT Pub. Date: Nov. 27, 2014

(65) Prior Publication Data
US 2016/0104978 A1 Apr. 14, 2016

(30) Foreign Application Priority Data

May 22, 2013 (FR) ...................... 13 54587

(51) Int. Cl.
*H01R 13/66* (2006.01)
*G01K 1/14* (2006.01)
(Continued)

(52) U.S. Cl.
CPC ............ *H01R 13/6683* (2013.01); *G01K 1/14* (2013.01); *G01K 1/16* (2013.01); *G01K 7/22* (2013.01);
(Continued)

(58) Field of Classification Search
CPC ............ H01R 13/6683; H01R 13/6658; H01R 13/6625; H01R 23/025; H01R 23/005; H05K 1/0228
(Continued)

(56) References Cited

U.S. PATENT DOCUMENTS 4,898,079 A * 2/1990 Combette ........... F15B 15/2892
200/82 E
5,413,493 A * 5/1995 Hoffman ............. B60L 11/1818
200/51.09
(Continued)

FOREIGN PATENT DOCUMENTS

DE 4108789 7/1992
DE 19901935 10/1999
(Continued)

OTHER PUBLICATIONS

International Search Report PCT/FR2014/051198 dated Jul. 10, 2014.

*Primary Examiner* — Abdullah Riyami
*Assistant Examiner* — Vladimir Imas
(74) *Attorney, Agent, or Firm* — Young & Thompson

(57) ABSTRACT

The electrical accessory (100) includes an electrically insulating body (110) housing at least two electrical connection elements (121, 122, 123), and a temperature sensor (200). The temperature sensor is received in a thermally conductive and electrically insulating support element (150) that is distinct from the body, and that is fitted inside the body in such a manner as to extend between the electrical connection elements, being set back from the outside faces of the body.

18 Claims, 7 Drawing Sheets

(51) Int. Cl.
*G01K 1/16* (2006.01)
*G01K 7/22* (2006.01)
*G01K 13/00* (2006.01)
*H01C 7/00* (2006.01)
*H01R 24/28* (2011.01)
*H01R 103/00* (2006.01)
*H01R 24/30* (2011.01)
*H01R 105/00* (2006.01)

(52) U.S. Cl.
CPC ............ *G01K 13/00* (2013.01); *H01C 7/008* (2013.01); *H01R 24/28* (2013.01); *G01K 2205/00* (2013.01); *H01R 24/30* (2013.01); *H01R 2103/00* (2013.01); *H01R 2105/00* (2013.01)

(58) Field of Classification Search
USPC ........................................ 439/620.22, 620.21
See application file for complete search history.

(56) References Cited

U.S. PATENT DOCUMENTS

| | | | | |
|---|---|---|---|---|
| 7,674,143 B2* | 3/2010 | Matsuo | .............. | G01N 27/4062 439/862 |
| 8,128,433 B2* | 3/2012 | Schempp | ............... | H01R 9/091 439/620.22 |
| 9,285,277 B2* | 3/2016 | Toudou | .................... | G01K 1/12 |
| 2006/0014404 A1* | 1/2006 | Iwamoto | ............. | G01D 11/245 439/76.2 |
| 2007/0141911 A1* | 6/2007 | Yoshikawa | ........ | G01N 27/4077 439/607.41 |
| 2009/0251832 A1 | 10/2009 | Brugner et al. | | |
| 2010/0112866 A1* | 5/2010 | Friedhof | ............ | H01R 13/6683 439/620.22 |
| 2010/0178806 A1* | 7/2010 | Montena | ............... | H01R 13/641 439/620.03 |
| 2011/0092100 A1* | 4/2011 | Coffey | ................. | H01R 13/641 439/620.22 |
| 2012/0051397 A1* | 3/2012 | Toudou | .................... | G01K 1/12 374/158 |
| 2012/0052708 A1* | 3/2012 | Herring | ................. | H01R 4/182 439/345 |
| 2012/0062385 A1* | 3/2012 | Wiesemann | .......... | B60L 3/0069 340/635 |
| 2014/0298931 A1* | 10/2014 | Oba | ....................... | H01R 11/01 73/866.5 |
| 2016/0006156 A1* | 1/2016 | Shimizu | ................... | H01R 4/72 439/310 |
| 2016/0072213 A1* | 3/2016 | Ichio | ................... | B60L 11/1818 439/34 |
| 2016/0072224 A1* | 3/2016 | Ichio | ................... | B60L 11/1818 439/345 |

FOREIGN PATENT DOCUMENTS

| | | |
|---|---|---|
| DE | 10314406 | 10/2004 |
| GB | 2020123 | 11/1979 |
| GB | 2207509 | 2/1989 |
| JP | 2002-352635 A | 12/2002 |

* cited by examiner

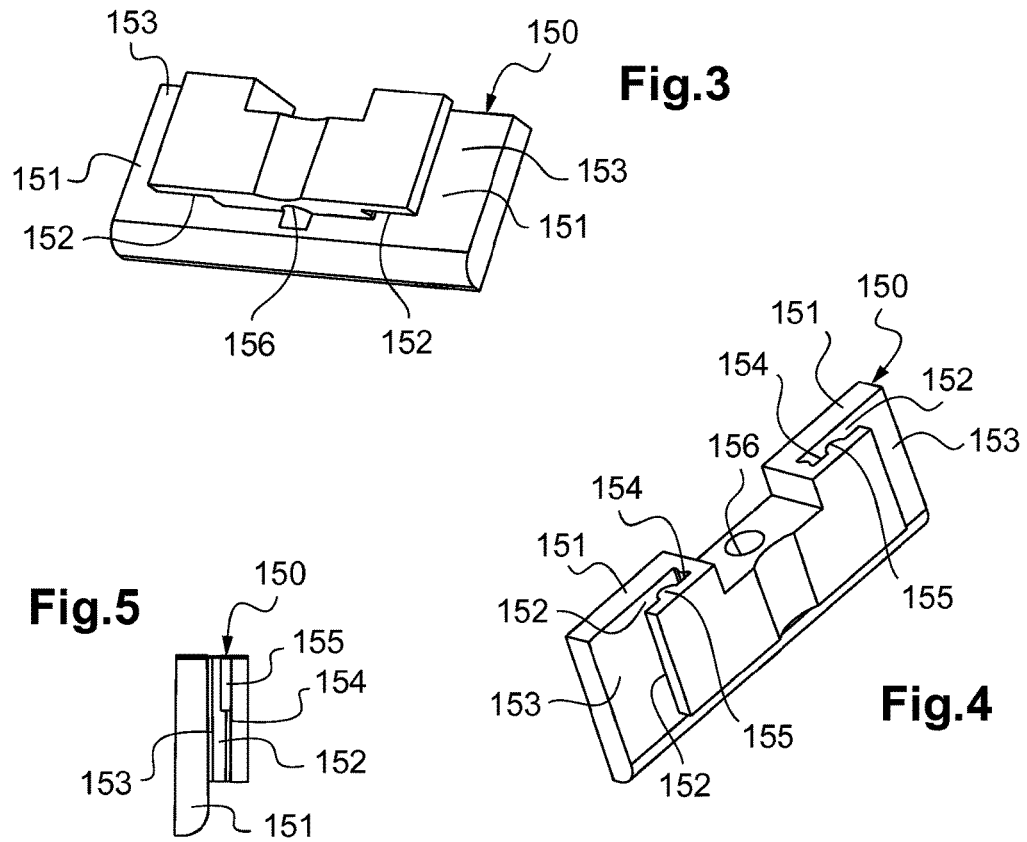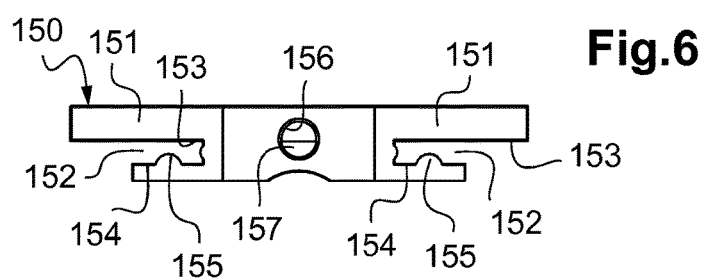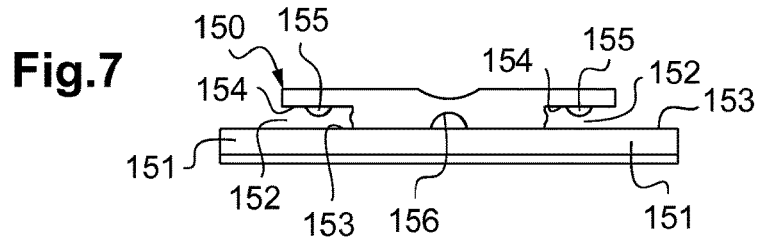

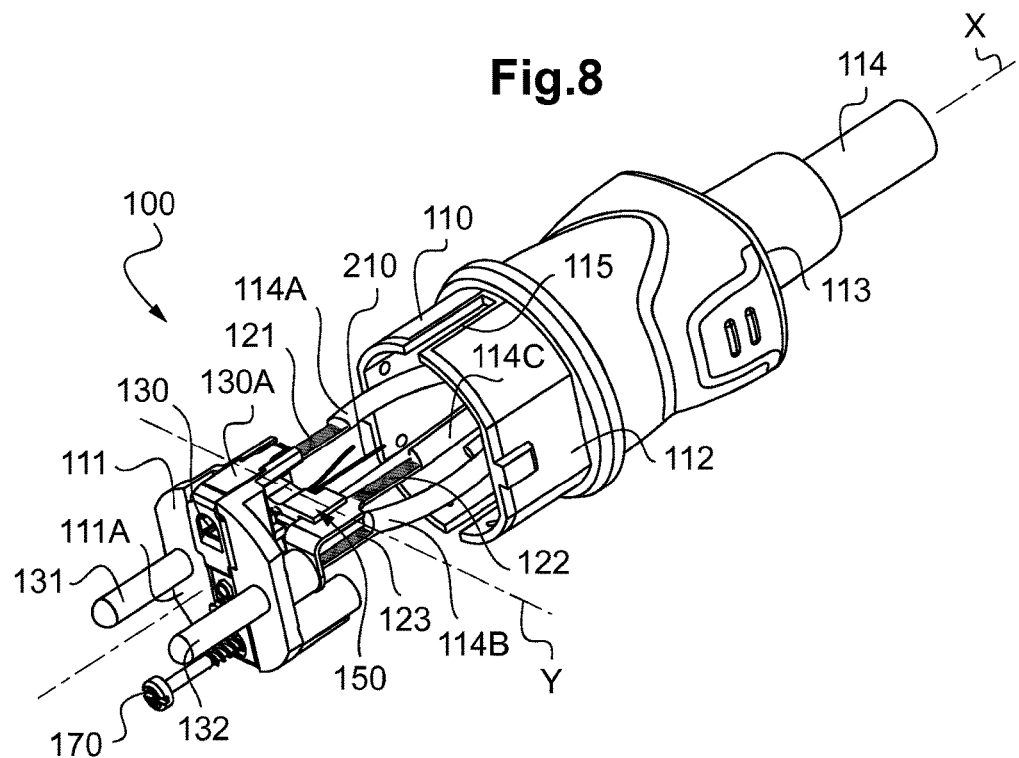
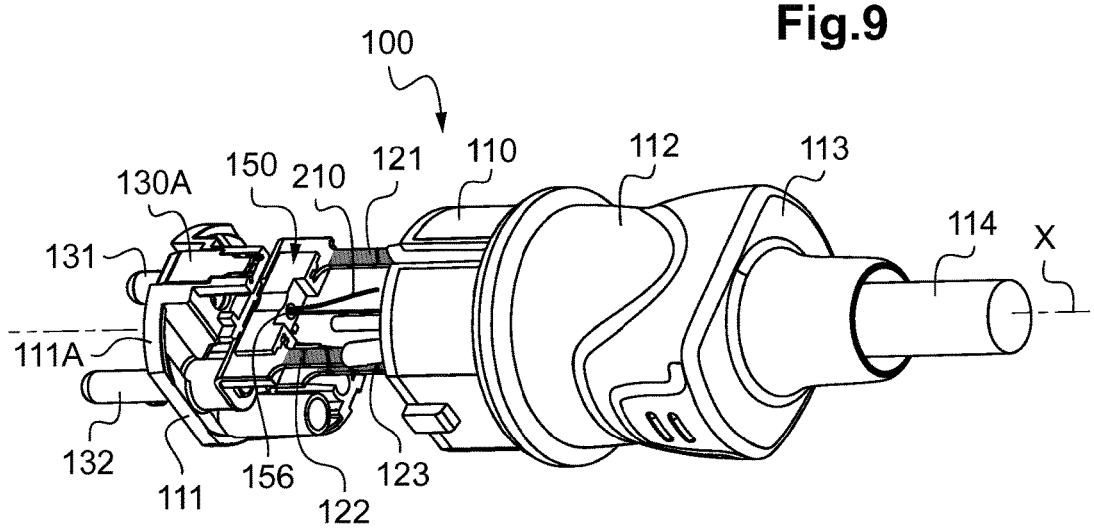

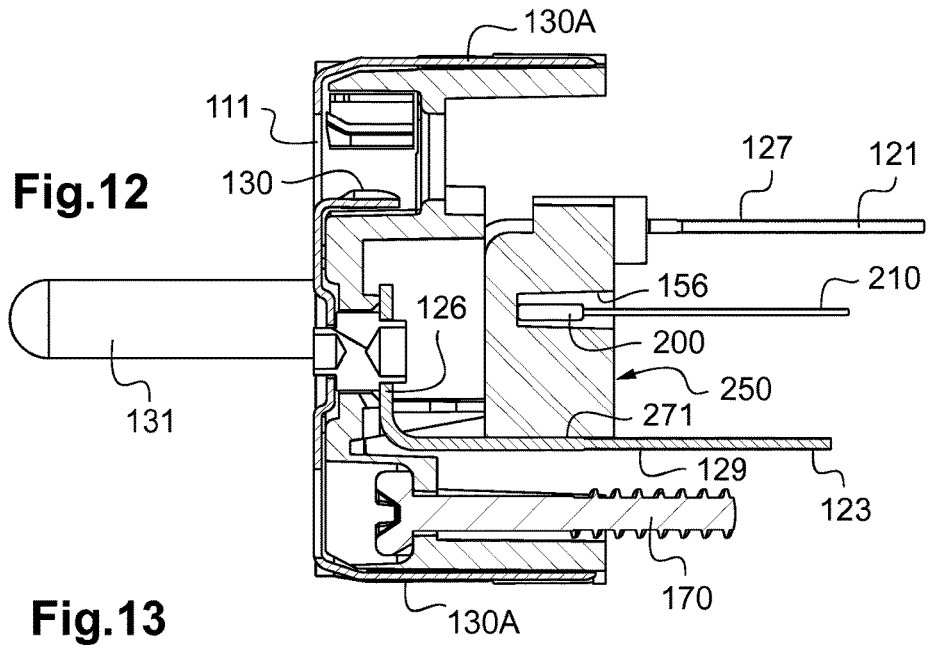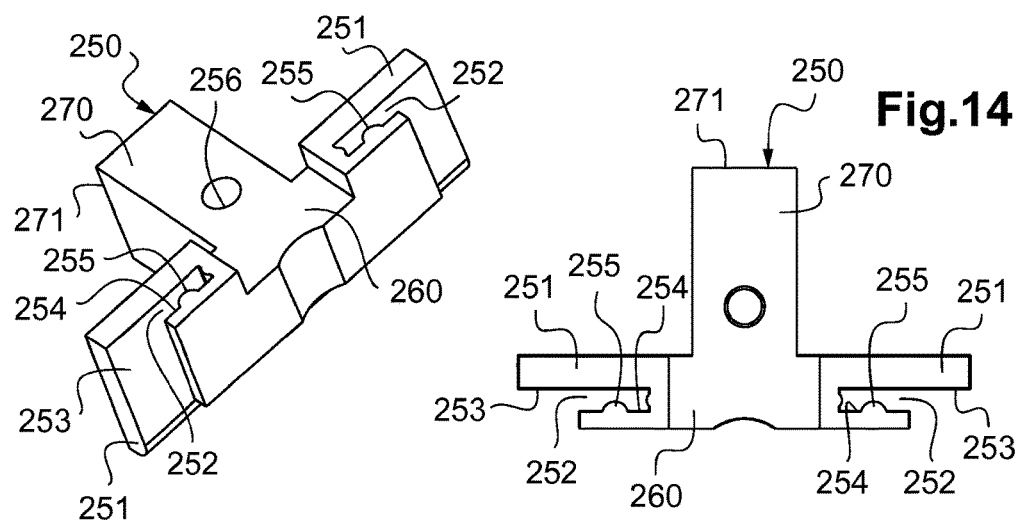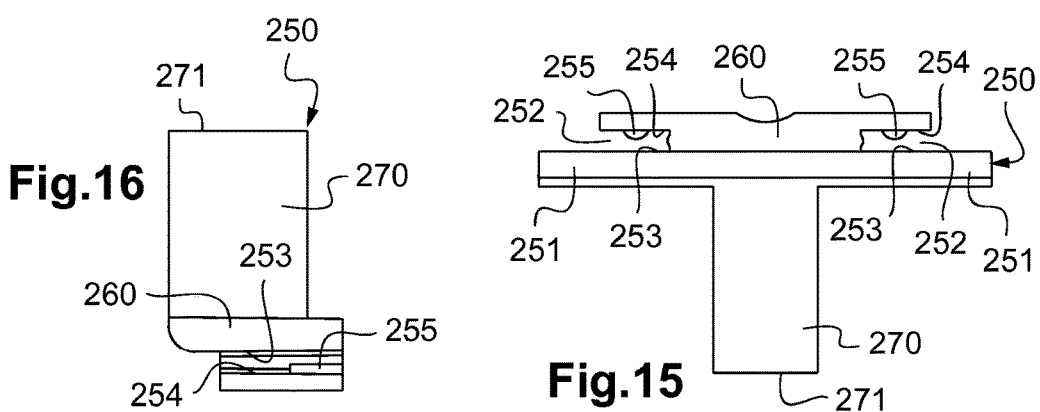

ELECTRICAL APPARATUS COMPRISING A TEMPERATURE SENSOR HOUSED IN A SUPPORT ELEMENT

BACKGROUND OF THE INVENTION

Field of the Invention

The present invention relates to an electrical accessory including an electrically insulating body housing at least two electrical connection elements, together with a temperature sensor.

The invention finds a particularly advantageous application in providing a connection plug for an electrical appliance, and a connection plug for recharging a battery of an electric vehicle.

Description of Related Art

An accessory as described in the introduction is known in particular from Document US 2009/0251832, which accessory constitutes an electrical connection plug in which each of the two electrical connection elements is connected to a respective connection pin that projects from the front face of said body.

In order to monitor heating of the electric plug, the electrical accessory described in that document includes two thermistors that are each adhesively-bonded to a respective one of the electrical connection elements of the electric plug.

That device presents the drawback of needing to use two thermistors. Furthermore, the thermistors are positioned on the electrical connection elements in a manner that is imprecise and consequently that is non-reproducible.

BRIEF SUMMARY OF THE INVENTION

In order to remedy the above-mentioned drawbacks of the prior art, the present invention proposes an electrical accessory in which a single temperature sensor is used that is arranged in precise and reproducible manner in the body of the electrical accessory, and that enables heating of at least one of the electrical connection elements to be detected effectively.

To this end, the invention proposes an electrical accessory as described in the introduction, in which the temperature sensor is received in a thermally conductive and electrically insulating support element that is distinct from said body, and that is fitted inside the body in such a manner as to extend between said electrical connection elements, being set back from the outside faces of said body.

Thus, the support element for supporting the temperature sensor forms a thermal bridge that conducts the heat dissipated by the two electrical connection elements. It is thus possible to use a single temperature sensor that makes it possible to monitor the temperature inside the electrical accessory, and to detect heating of either of the two electrical connection elements, since the support element conducts heat to the temperature sensor.

As a result of the support element being enclosed in the body of the electrical accessory, exchanges of heat are limited between the support element and any other part of the surroundings of the electrical accessory. In particular, the support element housing the temperature sensor does not include any portion or surface in contact with the surroundings outside the electrical accessory. The temperature measured by the temperature sensor positioned in the support element thus represents the temperature of the electrical connection elements more accurately, since it is not influenced by the temperature of the surroundings of the electrical accessory outside the body of the accessory.

Furthermore, as a result of the support element housing the temperature sensor, it is possible to position the temperature sensor precisely relative to the support element, and consequently relative to the electrical accessory as a whole. Such positioning can also easily be made to be reproducible.

The electrical accessory of the invention has other characteristics that are non-limiting and advantageous, as follows:

said support element includes mounting means for mounting on at least one of said electrical connection elements;

each mounting means pinches the corresponding electrical connection element;

each mounting means includes a housing with two inside faces that face towards each other, of which a first inside face matches a corresponding face of the electrical connection element, and a second inside face, that includes at least one curved portion, is suitable for pushing the electrical connection element against said first inside face;

said mounting means are a means for mounting by clipping onto the corresponding electrical connection element;

said support element comprises at least one first branch with two opposite ends, each provided with mounting means for mounting on a respective one of the electrical connection elements;

in a central portion, said support element includes an orifice that is suitable for receiving said temperature sensor;

the body houses three electrical connection elements, and the support element housing the temperature sensor is placed in contact with the three electrical connection elements;

said support element presents a section that is T-shaped, with a first branch that is provided with two opposite ends, including mounting means for mounting on two first electrical connection elements, and a second branch that extends between said first branch and the third electrical connection element;

said support element is mounted between the electrical connection element connected to the line and the electrical connection element connected to the neutral;

said electrical sensor is a thermistor;

said support element is made of a polymer material containing ceramic particles;

the material used to make the support element presents thermal conductivity that is greater than or equal to 10 watts per square meter-Kelvin (W/m$^{2 \cdot}$·K);

said electrical accessory is an electric plug including two electrical connection pins projecting from a front outside face of the body, each being electrically connected inside the body to a respective one of said electrical connection elements;

said electrical accessory is an electric plug including two electrical connection pins projecting from a front outside face of the body, each being extended inside the body by a stem that forms a respective one of said electrical connection elements for receiving a conductive portion of an electrical conductor, and said support element has said pins passing therethrough, such that it constitutes a pin support;

said support element is generally in the form of a plate that is perforated with two orifices through which said pins are force fitted, the plate presenting a front face that is adjacent to the rear inside face of the front wall of the body, and an opposite rear face from which said stems of the pins emerge;

the rear face of the support element includes at least one projecting rib that defines at least one reception housing for receiving a temperature sensor; and the support element includes snap-fastener means for snap-fastening a support card of a printed circuit to which each temperature sensor is electrically connected.

BRIEF DESCRIPTION OF THE SEVERAL VIEWS OF THE DRAWINGS

The following description of non-limiting examples given with reference to the accompanying drawings, makes it possible to understand what the invention consists of and how it can be reduced to practice.

In the accompanying drawings:

FIG. 3 is a diagrammatic front view in perspective of the support element of the FIG. 1 electrical connection plug;

FIG. 4 is a diagrammatic rear view in perspective of the support element of the FIG. 1 electrical connection plug;

FIG. 5 is a diagrammatic side view of the support element of the FIG. 1 electrical connection plug;

FIG. 6 is a diagrammatic view of the rear face of the support element of the FIG. 1 electrical connection plug;

FIG. 7 is a diagrammatic view of the front face of the support element of the FIG. 1 electrical connection plug;

FIG. 8 is an exploded diagrammatic front view in perspective of the FIG. 1 connection plug;

FIG. 9 is an exploded diagrammatic rear view in perspective of the FIG. 1 connection plug;

FIG. 12 is a diagrammatic view partially in section of the FIG. 10 electrical connection plug;

FIG. 13 is a diagrammatic rear view in perspective of the support element of the FIG. 10 electrical connection plug;

FIG. 14 is a diagrammatic view of the rear face of the support element of the FIG. 10 electrical connection plug;

FIG. 15 is a diagrammatic view of the front face of the support element of the FIG. 10 electrical connection plug;

FIG. 16 is a diagrammatic side view of the support element of the FIG. 10 electrical connection plug;

DETAILED DESCRIPTION OF THE INVENTION

Figure 1:
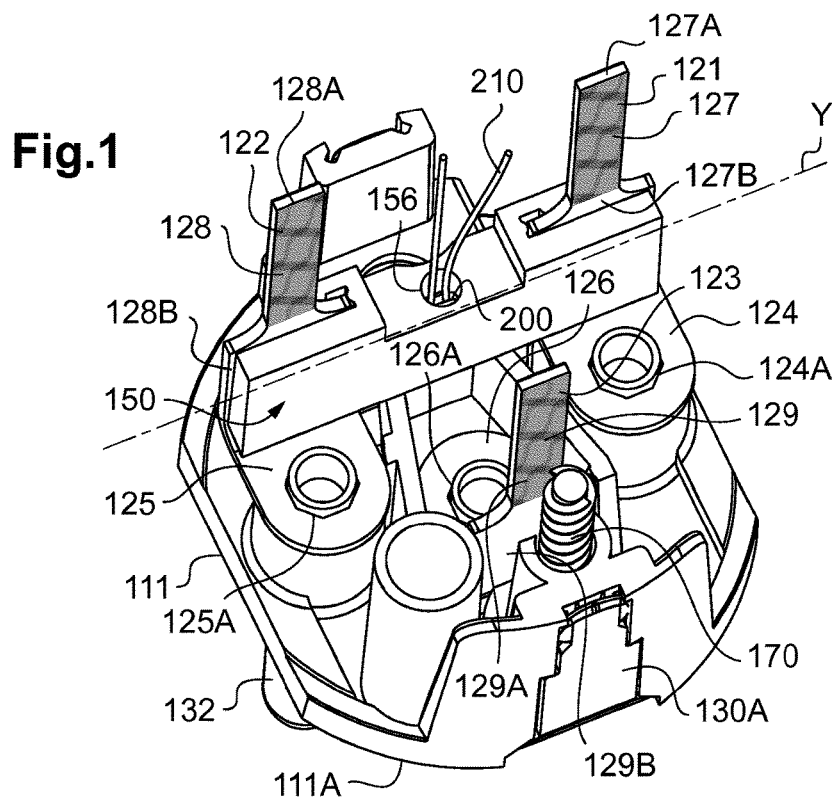
FIG. 1 is a diagrammatic and fragmentary rear view in perspective of a first embodiment of an electrical accessory of the invention, which is of the electrical connection plug type.

As a preamble, it should be observed that, as far as possible, identical or similar elements of the various embodiments are referenced using the same references, and they are not described each time.

FIGS. 1 to 17 show two possible embodiments of an electrical accessory 100 of the invention.

The two embodiments differ only by the particular shape of the support element of the temperature sensor described below.

In these embodiments, the electrical accessory in question is an electric plug 100 for connecting an electrical appliance (not shown), which plug is suitable for being plugged into a complementary socket outlet (not shown), so as to power the electrical appliance electrically. In particular, the electrical appliance in question may be an electric vehicle that includes an electric battery that is connected to said electric plug 100 via a power cable 114 for connecting it to a socket outlet with a view to recharging it.

In conventional manner, the electric plug 100 includes an electrically insulating body 110 (FIGS. 8, 9, and 17) that, in these embodiments, houses three electrical connection elements 121, 122, 123.

The insulating body 110 presents a shape that is elongate along the direction of a longitudinal axis X of the electric plug 100.

It is made of electrically insulating material, e.g. by molding plastics material.

It forms a casing that comprises a front wall 111 and a side wall 112. It is closed at the rear by a rear portion 113 from which a power cable 114 emerges.

The power cable 114 makes it possible to connect the electric plug 100 electrically to the corresponding electrical appliance.

In these embodiments, the side wall 112 is in the form of a sleeve. The front wall 111 closes the sleeve at the front. By way of example, it is fastened thereon by a fastener screw 170 (FIGS. 8 and 17) that passes through said front wall 111 and that is screwed into a tapped well of the sleeve.

Figure 17:
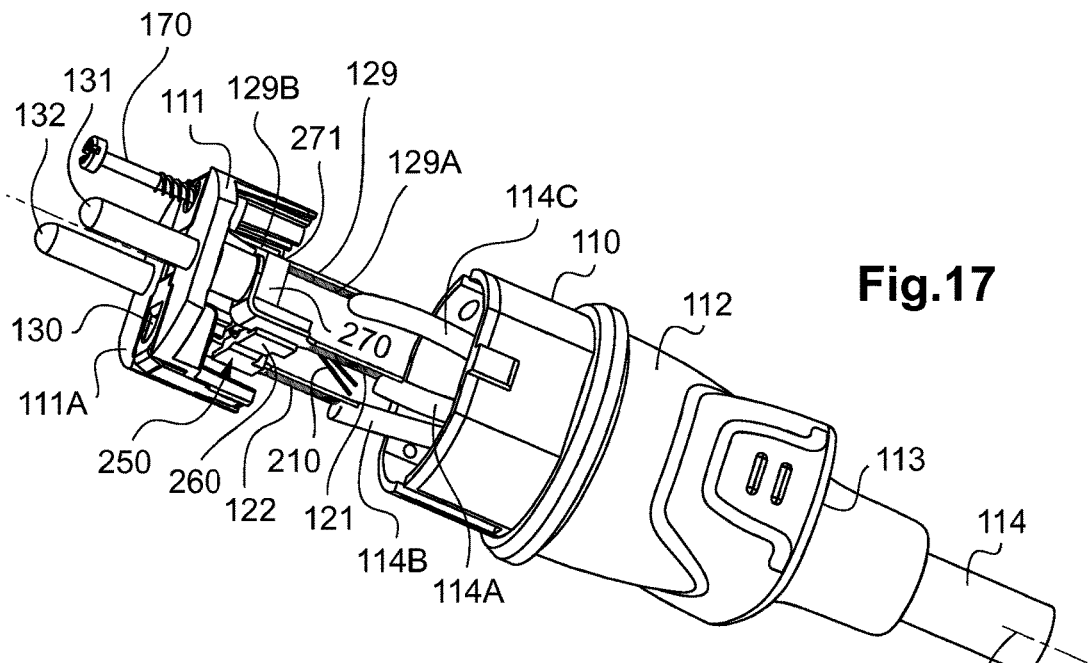
FIG. 17 is an exploded diagrammatic perspective view of the FIG. 10 electrical connection plug.

As can be seen in FIGS. 8 and 17, inside the sleeve, the power cable 114 does not have an insulating outer sheath, and the conductor wires 114A, 114B, and 114C conveyed inside the sheath may be separated from one another for electrically connecting each of them to one of the ends of a respective connection element 121, 122, 123. In practice, the conductor wires 114A, 114B, 114C are welded or crimped to the ends of the connection elements 121, 122, 123.

The body 110 also houses, in part, two metal electrical connection pins 131, 132 that emerge from the front outside face 111A of the front wall 111 of the body 110 along directions that are parallel to the longitudinal axis X of said body 110 (FIGS. 1, 2, 8, 9, 10, 11, 12, and 17).

Each of the pins 131, 132 is suitable for being inserted into a complementary electrical connection terminal of the corresponding socket outlet for electrically connecting the electric plug 100.

Said front wall 111 of the body 110 also includes a housing that opens out onto the front outside face 111A of the front wall 111 via an opening.

The housing houses a terminal 130 that is suitable for receiving a ground pin, if any, of the socket outlet inserted through said opening, so as to connect the electric plug 100 to ground (see in particular FIGS. 8 and 12).

By way of example, this is true of standard socket outlets in France, each of which includes, in its front face, a reception well for receiving the electric plug, the bottom of the well having the openings that give access to the terminals of the socket outlet opening out therein, and said ground connection pin projecting therefrom.

The examples of electric plug 100 shown in the figures are also suitable for being used with socket outlets in accordance with the German standard, in which a reception well is also provided for receiving the electric plug, the bottom of the well having the openings that give access to the terminals of the socket outlet opening out therein, and the diametrically-opposite ends of a ground connection lyre projecting therefrom.

To this end, the terminal 130 housed in the housing of the front wall 111 of the electric plug 100 includes at least one side plate 130A that extends from the front wall 111 towards the rear of the electric plug 100 (see in particular FIG. 8).

This side plate 130A is suitable for being positioned facing a slot 115 that is formed longitudinally in the side wall 112 of the body 110 of the electric plug 100.

In this way, the side plate 130A of the electrical terminal 130 is accessible from the outside of the body 110 of the electric plug 100, so that one of the ends of the ground connection lyre of a German standard socket outlet can thus come into contact with the side plate 130A while the electric plug 100 is being inserted into the corresponding socket outlet.

In these embodiments, the terminal 130 advantageously includes two side plates 130A that are diametrally opposite.

Each of the two pins 131, 132 and the terminal 130 of the electric plug 100 that are all accessible at the front outside face 111A of the electric plug, includes a rear portion that is housed inside the body 110, and that projects from a rear face of the front wall 111 into the body (FIGS. 1, 2, 10, and 11).

The rear portion of each of the two pins 131, 132 and of the terminal 130 is thus electrically connected to the other end of one of the electrical connection elements 121, 122, 123 housed in the body 110, opposite from its end connected to a respective one of the conductor wires 114A, 114B, 114C. To this end, the electrical connection element may be crimped or welded onto the rear portion of the corresponding pin, or it may be made integrally with the pin.

In these embodiments, the electrical connection elements 121, 122, 123 thus constitute intermediate elements that make it easy for the pins 131, 132 and the terminal 130 that are accessible at the front outside face 111A of the electric plug 100 to be connected electrically to the conductor wires 114A, 114B, 114C of the power cable 114.

In these embodiments, each of the electrical connection elements 121, 122, 123 is in the form of a metal blade bent into an L-shape.

More particularly, each of the electrical connection elements 121, 122, 123 comprises a main portion 127, 128, 129 that extends parallel to the longitudinal axis X of the body 110, and a tab 124, 125, 126 at the front end of the main portion, i.e. its end closer to the front wall 111 of the body 110, which tab 124, 125, 126 extends substantially perpendicularly to the main portion. The tab 124, 125, 126 includes an opening 124A, 125A, 126A through which said rear portion of the corresponding pin 131, 132 or terminal 130 passes, so as to establish electrical connection with the pin or the terminal (see FIGS. 1 and 11).

The main portion 127, 128, 129 of each electrical connection element 121, 122, 123 comprises a base 127B, 128B, 129B that is adjacent to the tab 124, 125, 126, and an end portion 127A, 128A, 129A having a width that is narrower than the width of the base.

The main portions 127, 128, 129 and the tabs 124, 125, 126 of the electrical connection elements 121, 122, 123 extend respectively parallel to one another (FIG. 1).

The main portions 127, 128 of the two electrical connection elements 121, 122 connected to the pins 131, 132 of the electric plug are arranged in a single first plane. The main portion 129 of the electrical connection element 123 connected to the earth terminal 130 of the electric plug 100 is situated in a second plane that is parallel to and offset from the first plane.

The electric plug 100 further includes a temperature sensor 200.

In these embodiments, the temperature sensor is more particularly a thermistor. However, any temperature sensor known to the person skilled in the art could be envisaged.

The temperature sensor 200 is received in a thermally conductive and electrically insulating support element 150; 250 that is distinct from said body 110, and that is fitted inside the body 110 in such a manner as to extend between said electrical connection elements 121, 122, 123, being set back from the outside faces of said body 110.

In other words, the support element 150; 250 constitutes a part that is distinct from the body 110, enclosed inside the casing that constitutes the body 110.

In these embodiments, there is no portion in contact with the outside of the body 110.

In particular, in these embodiments, and as shown in FIGS. 1, 2, 8, 9, 12, 13, and 19, the support element 150; 250 is arranged set back from the inside face of the front wall 111, from the side wall 112, and from the rear wall 113 of the body 110.

More precisely, the support element 150; 250 occupies a very small volume around and between the electrical connection elements 121, 122, 123.

In a first embodiment of the electric plug 100 of the invention, shown in FIGS. 1 to 9, the support element 150 extends between the two electrical connection elements 121, 122 connected to the pins 131, 132 of the electric plug 100.

It thus presents the shape of a plate that is elongate along a main axis Y (FIGS. 1, 2, and 8), having two opposite ends 151 along the main axis.

The support element 150 is arranged in the body 110 in such a manner that its main axis Y extends transversally to the longitudinal axis X of the body 110.

In this embodiment, each of the ends 151 (see FIG. 3) of the support element 150 includes mounting means for mounting the support element 150 on a respective one of the electrical connection elements 121, 122.

Each mounting means pinches the corresponding electrical connection element.

To this end, each mounting means comprises a housing 152 that receives a respective one of the connection elements 121, 122. In this embodiment, each housing 152 is like a slot formed in the free end 151 of the support element 150.

The slot includes an end wall that extends parallel to the longitudinal axis X of the body 110 of the electric plug 100, and two inside faces 153, 154 that face towards each other, extending parallel to the main axis Y of the support element 150 and to the longitudinal axis X of the body of the electric plug 100.

A first inside face 153 of the housing 152 matches a corresponding face of the electrical connection element 121, 122, and a second inside face 154 of the housing 152 includes at least one curved portion that is suitable for pushing the electrical connection element 121, 122 against said first inside face 153.

In this embodiment, the first inside face 153 of the housing 152 is generally plane, so as to bear against the connection element 121, 122.

In order to maximize conduction of the heat dissipated by the connection element 121, 122 via the support element 150, while limiting the space occupied by the support element 150, the first inside face 153 of the support element 150 bears against the base 127B, 128B of the corresponding connection element 121, 122 that presents a width that is wider than the end portion of the connection element 121, 122 (see FIG. 1).

Figure 2:
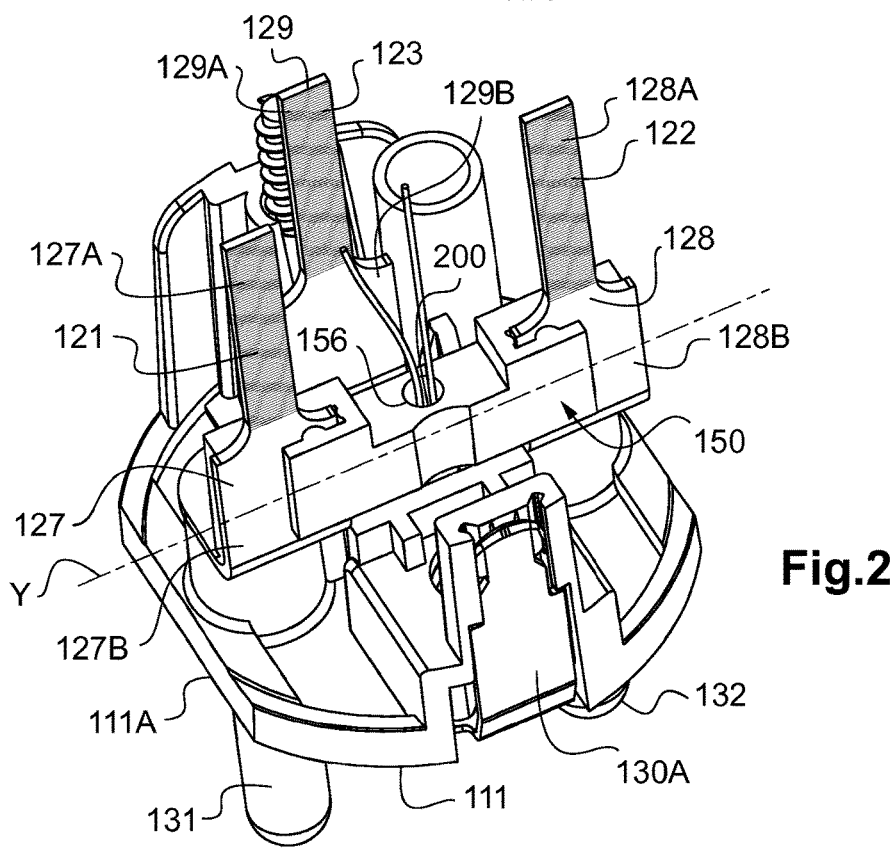
FIG. 2 is a diagrammatic and fragmentary rear view in perspective of the FIG. 1 electrical connection plug, turned through 180 degrees relative to FIG. 1.

A rounded ridge 155 forming said curved portion of the second inside face 154 of the housing 152 projects from the second inside face 154 of each housing 152, towards the first inside face 153 (see FIG. 2).

The ridge 155 extends in a direction that is transverse to the main axis Y of the support element 150. Consequently, the ridge 155 extends parallel to the longitudinal axis X of the body 110, i.e. parallel to the main portion 127, 128 of the connection element 121, 122.

The thickness of the ridge 155 is designed to be such that the width of the housing 152 at the ridge 155 is a little smaller than the thickness of the base 127B, 128B of the connection element 121, 122.

Thus, when the base 127B, 128B of the connection element 121, 122 is inserted into the housing 152, the portion of the support element 150 that carries the second inside face 154 that is provided with the ridge 155 of the housing 152 deforms a little so as to enable the base of the electrical connection element to pass.

In this way, the base of the connection element 121, 122 is pushed by the ridge 155 against the first inside face 153 and becomes clamped, in other words, pinched, between the ridge 155 and the first inside face 153 of the housing 152 of the support element 150 (FIGS. 1 and 2).

Contact between the first inside face 153 of the housing 152 and the support element 150 of the temperature sensor 200 is thus ensured.

The dimensions and the shape of the first inside face 153 of the housing 152 are further determined for maximizing the contact surface area between the first inside face 153 and the connection element 121, 122, while limiting the steric hindrance associated with the presence of the support element 150.

In this way, the heat dissipated by the connection elements 121, 122 is well conducted by the support element, even though its volume is limited.

In this embodiment, and by way of example, the first inside face 153 presents dimensions that are greater than the dimensions of the second inside face, and it presents a curved edge that is suitable for following the curvature of the connection element 121, 122 at the junction between the main portion 127, 128 and the tab 124, 125 of the contact element 121, 122.

The ridge 155 advantageously extends over only a fraction of the second inside face 154 of the housing 152 (FIG. 5).

In a variant, the ridge may extend fully over the second inside face of the housing. It could also be replaced by one or more rounded bulges for performing the same role. Finally, it is also possible for the second inside face of the housing to be generally curved over its entire surface, with at least a portion of its surface being curved towards the first inside face of the housing.

Still in a variant, each mounting means may be a means for mounting by clipping onto the corresponding electrical connection element. By way of example, clipping may be achieved using means similar to the means described below: for example, the end portion of the connection element may be inserted into a slot similar to the slot described above, with a hard point for passing over that is defined by a ridge similar to the ridge described above.

Finally, in a central portion, the support element 150 includes an orifice 156 that is suitable for receiving said temperature sensor 200.

In this embodiment, the orifice 156 is at the middle of the support element 150, i.e. mid-way between its two opposite ends 151 (see FIGS. 1 and 2).

It extends perpendicularly relative to the main axis Y of the support element 150, parallel to the longitudinal axis X of the body 110 of the electric plug 100.

In this embodiment, the orifice is a cylindrical orifice having a diameter that is similar to the transverse dimensions of the temperature sensor 200, ignoring clearance to allow it to be inserted into the orifice 156.

The orifice 156 is closed, at least in part, by an end wall 157 on the side of the support element 150 that faces towards the front of the electric plug 100.

In this embodiment, the end wall 157 closes half of the orifice 156 (see FIG. 6).

While the electric plug 100 is being assembled, the temperature sensor 200 may thus be inserted into the orifice 156 until it comes into abutment against the end wall 157. The position of the temperature sensor 200 in the support element 150 is thus defined precisely and is easily reproducible.

Since the mounting means for mounting the support element 150 on the connection elements 121, 122 also guarantee that the support element 150 is mounted at a precise and reproducible position, the position of the temperature sensor 200 in the electric plug 100 is thus known precisely and can be reproduced easily.

In a second embodiment of the electric plug of the invention, shown in FIGS. 10 to 17, the support element 250 housing the temperature sensor 200 is in contact with the three electrical connection elements 121, 122, 123 of the electric plug 100.

To this end, the support element 250 presents a section that is T-shaped, with a first branch 260 that is similar to the support element described in the first embodiment, and a second branch 270 that extends perpendicularly between said first branch and the third electrical connection element 123 (FIGS. 10 to 16).

More precisely, the first branch 260 of the support element 250 is provided with two opposite ends 251 (FIGS. 13 to 15), each including mounting means for mounting on a respective one of the two electrical connection elements 121, 122 connected to the connection pins 131, 132 of the electric plug 100.

As in the first embodiment, each mounting means pinches the corresponding electrical connection element.

To this end, each mounting means comprises a housing 252 that receives a respective one of the connection elements 121, 122. The housings 252 are identical to the above-described housings, with two inside faces 253, 254 that face towards each other, of which a first inside face 253 matches a corresponding face of the electrical connection element 121, 122, and a second inside face 254 of the housing 152, that includes at least one curved portion that is suitable for pushing the electrical connection element 121, 122 against said first inside face 253 (FIGS. 13 to 16).

As in the first embodiment, the curved portion of the second inside face 154 of the housing 152 is in the form of a rounded ridge 255 that projects from the second inside face 254 to into the housing 252, towards the first inside face 253 (FIGS. 13 to 16).

The embodiment details, advantages, and variants that can be envisaged for the mounting means of the first branch 260 of the support element 250 are identical to the mounting means described with reference to the first embodiment.

The second branch 270 of the support element 250 extends from the central portion of the first branch 260, situated between the connection elements 121, 122 of the electric plug 100, perpendicularly to the first branch 260.

It includes a free end 271 that presents a shape that is suitable for coming into contact with the third connection element 123 of the electric plug 100, connected to the ground terminal of the electric plug 100. In this embodiment, the free end 271 of the second branch 270 of the support element 250 comes into contact with a portion of the base 129B, and with a portion of the end portion 129A of the main portion 129 of the third connection element 123.

In this embodiment, the free end 271 of the second branch 270 is plane.

Figure 10:
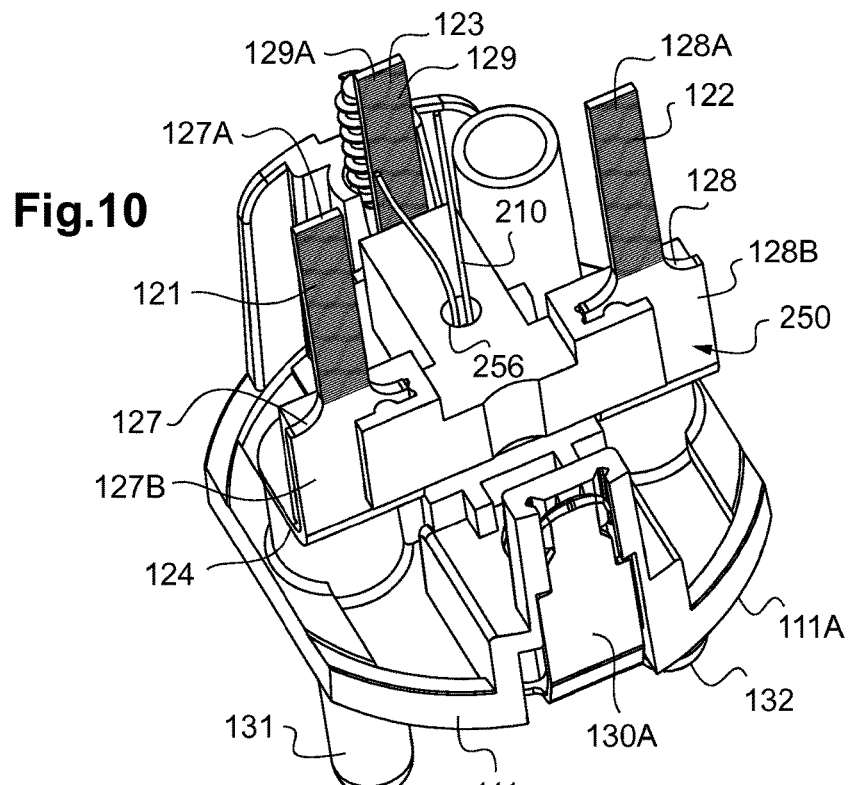
FIG. 10 is a diagrammatic and fragmentary rear view in perspective of a second embodiment of an electrical accessory of the electrical connection plug type of the invention.
Figure 11:
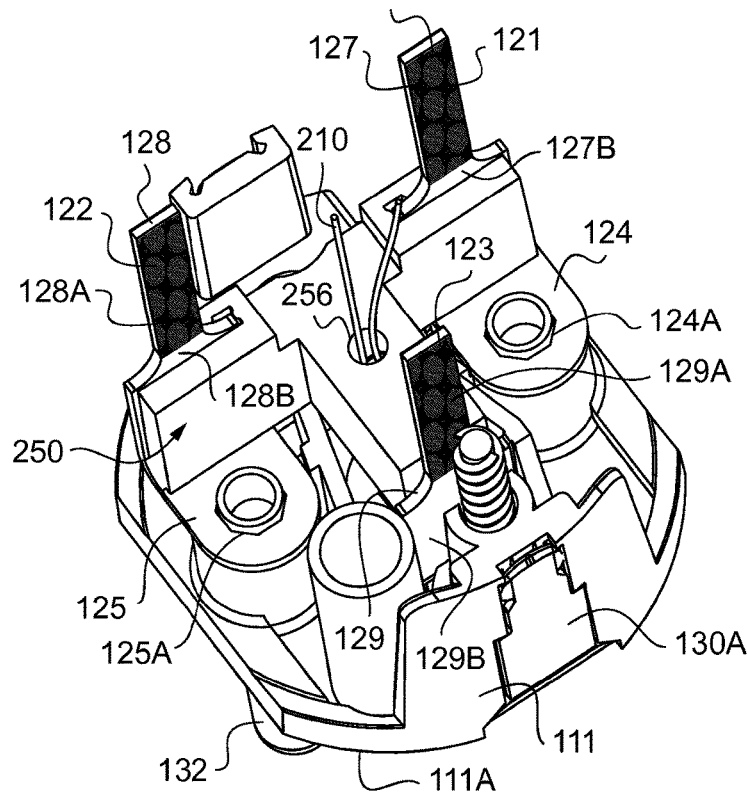
FIG. 11 is a diagrammatic and fragmentary rear view in perspective of the FIG. 10 electrical connection plug, turned through 180 degrees relative to FIG. 10.

Furthermore, the free end 271 of the second branch 270 of the support element 250 does not include any mounting means for mounting on the third connection element 123 of the electric plug 100, but the length of the second branch 270 is determined so that the plane face forming the free end 271 bears against the base 129B of the main portion 129 of the third connection element 123 (FIGS. 10 and 11).

In a variant, provision could be made for the free end of the second branch of the support element to include mounting means for mounting on the third connection element of the electric plug.

Finally, as in the first embodiment of the electric plug 100, the support element 250 includes an orifice 256 that is suitable for receiving said temperature sensor 200.

The orifice 256 is arranged in the second branch 270 of the support element 250. It extends parallel to the longitudinal axis X of the body 110 of the electric plug 100.

In this embodiment, the orifice is a cylindrical orifice having a diameter that is similar to the transverse dimensions of the temperature sensor, ignoring clearance to allow it to be inserted into the orifice 256.

In this embodiment, the orifice 256 is an orifice that is blind on the side of the support element 250 that faces towards the front of the electric plug 100 (FIG. 17).

As above, the temperature sensor 200 may thus be positioned precisely and in reproducible manner in the body 110 of the electric plug 100.

FIGS. 18 to 21 show another possible embodiment of the electrical accessory of the invention.

The electrical accessory is likewise an electric plug 100' that, in conventional manner, comprises an electrically insulating body 110' that is elongate along a longitudinal axis X, the body forming a casing with a front wall 111', a side wall, and a rear portion 112' from which there emerge insulated electrical conductors 114'A, 114'B, 114'C coming from a power cable 114' that makes it possible to connect the electric plug 100' electrically to the corresponding electrical appliance. The body 110' houses, in part, two metal electrical connection pins 131', 132' that emerge outside the front outside face 111'A of the front wall 111' of the body 110 along directions that are parallel to the longitudinal axis X. Each of the pins 131', 132' is extended inside the body 110' by a respective stem 121',122' that forms an electrical connection element for receiving a conductive metal core 115'A, 115'B of the electrical conductor 114'A, 114'B coming from the cable 114'. In this embodiment, as can be seen better in FIG. 19, preferably each pin 131', 132' is machined, and each electrical conductor 114'A, 114'B is crimped inside the stem 121', 122' of the corresponding pin. Naturally, in a variant, provision could be made for the bared conductive core of each electrical conductor to be welded to the stem of the pin.

Each of the pins 131', 132' is suitable for being inserted into a complementary electrical connection terminal of the corresponding socket outlet for electrically connecting the electric plug 100'.

Figure 18:
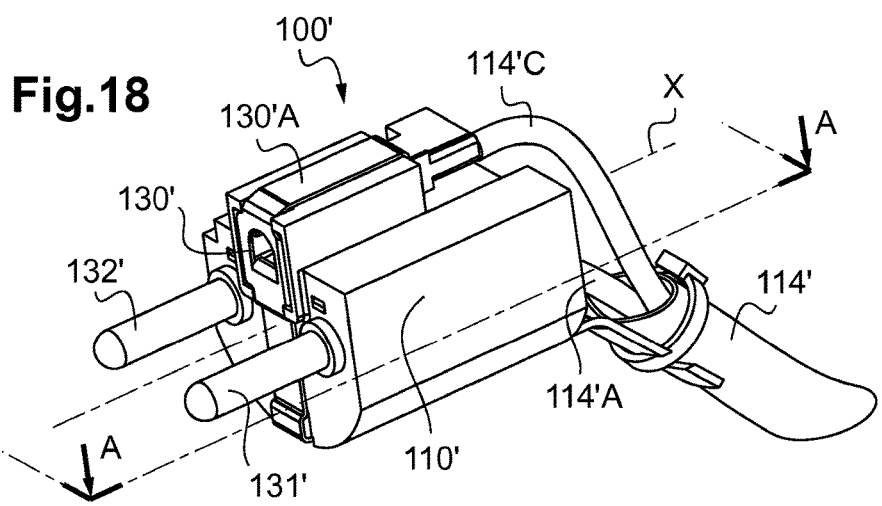
FIG. 18 is a diagrammatic perspective view of another embodiment of the electrical accessory of the invention.

Said front wall 111' of the body 110' also includes a housing that opens out onto the front outside face 111'A of the front wall 111' via an opening. As shown in FIG. 18, the housing houses a terminal 130' that is suitable for possibly receiving a ground pin of the socket outlet inserted through said opening, so as to connect the electric plug 100' to ground. By way of example, this is true of standard socket outlets in France, each of which includes, in its front face, a reception well for receiving the electric plug, the bottom of the well having the openings that give access to the terminals of the socket outlet opening out therein, and said ground connection pin projecting therefrom.

The electric plug 100' shown in FIGS. 18 to 21 is also suitable for being used with socket outlets in accordance with the German standard, in which a reception well is also provided for receiving the electric plug, the bottom of the well having the openings that give access to the terminals of the socket outlet opening out therein, and the side wall of the well having the diametrally-opposite ends of a ground connection lyre projecting therefrom.

To this end, the terminal 130' housed in the housing of the front wall 111' of the electric plug 100' includes two conductive side plates 130'A that extend from the front wall 111' towards the rear of the electric plug 100' (see FIG. 18). One of the side plates 130'A is connected to a connection element 123' to which there is crimped the bared conductive core of the electrical ground conductor 114'C coming from the cable 114' (see FIG. 20). Each side plate 130'A extends over the side wall of the body 110' of the electric plug 100'. In this embodiment, the body 110' is to be overmolded in an angled insulating outer casing (not shown) that, at the rear, covers the rear wall 112' of the body 110', and also encloses the portion of the electrical conductors 114'A, 114'B, 114'C that emerge from the body 110', and a portion of the insulating sheath of the cable 114'. At the front, the insulating outer casing covers the side wall and the front wall 111' of the body 110' around the pins 131', 132', the terminal 130', and the side plates 130'A, so as to leave them visible and accessible on the outside surface of the electric plug 100'. In this way, each side plate 130'A of the electrical terminal 130' is accessible on the outside of the electric plug 100', so that each end of the ground connection lyre of a German standard socket outlet can thus come into contact with each side plate 130'A while the electric plug 100' is being inserted into the corresponding socket outlet.

Figure 19:
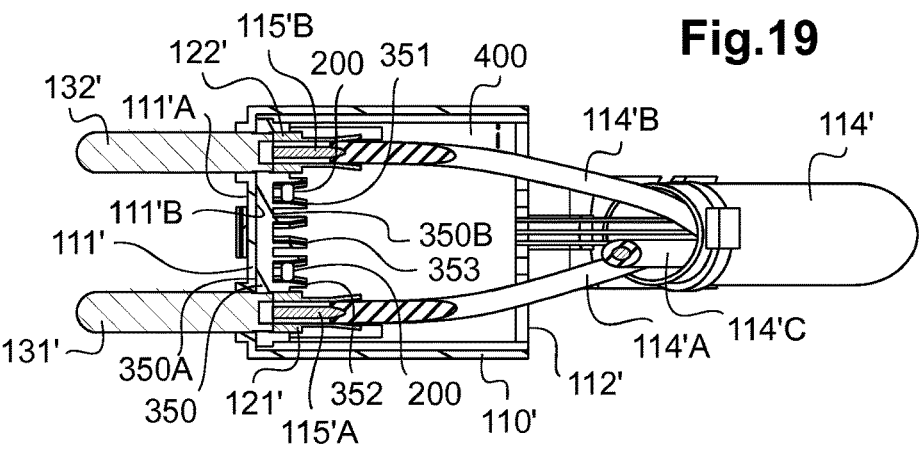
FIG. 19 is a section view on plane A-A in FIG. 18.
Figure 20:
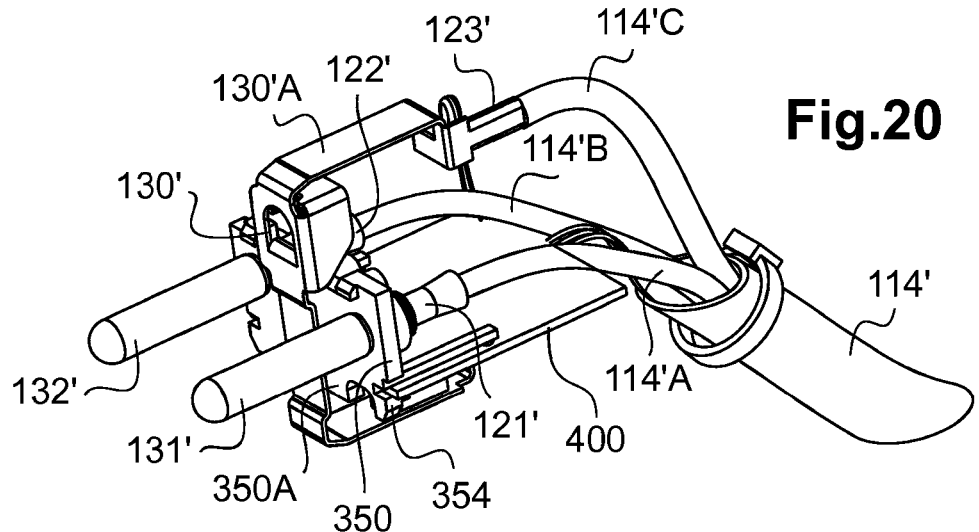
FIG. 20 is a diagrammatic and fragmentary perspective view of the FIG. 18 electrical accessory without its outer insulating casing.
Figure 21:
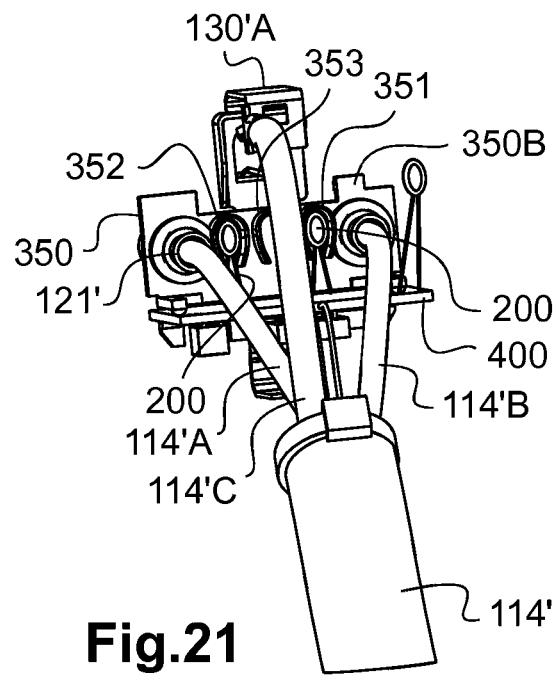
FIG. 21 is a rear view of FIG. 20.

Remarkably in this embodiment, and as shown better in FIGS. 19 to 21, the thermally conductive and electrically insulating support element 350 that houses a temperature sensor 200, and that is fitted inside the body 110', set back from the outer faces of said body 110', has said pins 131', 132' passing therethrough, such that it constitutes a pin support. The support element 350 extends between the stems 121', 122' of the pins 131', 132'.

More particularly, the support element 350 is generally in the form of a plate that is perforated with two orifices through which said pins 131', 132' are force fitted. This is why on a portion of its outer surface, each pin 131', 132' advantageously includes, situated at the base of the pin, just before the stem, knurling or notching that makes it possible to strengthen the grip of the pin in the support element 350. The plate 350 presents a front face 350A that is adjacent to the rear inside face 111'B of the front wall 111' of the body 110', and an opposite rear face 350B from which said stems 121', 122' of the pins 131', 132' emerge. The rear face 350B of the plate forming the support element 350 includes at least one projecting rib 351 that defines at least one reception housing for receiving a temperature sensor 200. In this embodiment, it includes three ribs 351, 352, 353 that define three housings for three possible sensors 200.

Whatever the embodiment under consideration, the electric plug further includes a secondary electrical circuit that is connected to the temperature sensor 200.

The term "secondary" electrical circuit is used to mean an electrical circuit of the electric plug 100; 100' that is distinct from the main electrical circuit that connects the pins 131, 132; 131', 132' of the electric plug 100; 100' to the corresponding electrical appliance.

Only the conductor wires 210 are shown leaving the temperature sensor 200. In practice, the conductor wires 210 (FIG. 12) are electrically connected with other conductor wires conveyed by the power cable 114. This makes it possible to connect the temperature sensor 200 to an electronic control unit of the electrical appliance powered by means of the electric plug of the invention.

Advantageously, in the embodiment shown in FIGS. 20 and 21, the support element 350 includes snap-fastener means 354 for snap-fastening a support card of a printed circuit 400 that forms the secondary circuit to which each temperature sensor 200 is electrically connected.

If at least one of the connection elements 121, 122, 123; 121', 122' in contact with the support element 150; 250; 350 heats up, the heat dissipated by the connection element is conveyed to the temperature sensor 200 via the support element 150; 250; 350. When the temperature measured by the temperature sensor exceeds a threshold temperature value, the control unit is programmed to stop electrically powering the electrical appliance, or to decrease its electricity consumption, and thus decrease the electric current being delivered to the electrical appliance.

Thus the risk of the electric plug 100; 100' heating up is limited.

Advantageously, in order to make the temperature measurement more accurate by reducing the time needed to detect heating of one of the connection elements, the support element 150; 250; 350 is made of a polymer material containing ceramic particles.

By way of example, the polymer is polycaprolactam (PA6). The ceramic particles are embedded in the polymer. The quantity of ceramic particles in the polymer lies in the range 10% to 30% by weight, for example.

Preferably, the material used to make the support element 150; 250; 350 presents thermal conductivity that is greater than or equal to 10 W/m²·K.

The material is preferably a material that is different from the material used to make the body 110; 110' of the electric plug 100; 100'.

In a variant, the electric plug may house only two connection elements, e.g. a line connection element and a neutral connection element. The support element thus presents the shape described in the first embodiment.

Still in a variant, it may be envisaged that the electrical accessory is a socket outlet. The support element of the temperature sensor is then in contact with the electrical connection elements connected to the sockets and/or to the ground terminal of the socket outlet.

The invention claimed is:

1. An electrical accessory (100; 100') including an electrically insulating body (110; 110') housing at least two electrical connection elements (121, 122, 123; 121',122', 123'), and a temperature sensor (200), the electrical accessory being characterized in that the temperature sensor (200) is received in a thermally conductive and electrically insulating support element (150; 250; 350) that is distinct from said body (110; 110'), and that is fitted inside the body (110; 110') in such a manner as to extend between said electrical connection elements (121, 122, 123; 121', 122', 123'), being set back from the outside faces (111A; 111'A) of said body (110).

2. An electrical accessory (100) according to claim 1, wherein said support element (150; 250) includes mounting means for mounting on at least one of said electrical connection elements (121, 122, 123).

3. An electrical accessory (100) according to claim 2, wherein each mounting means pinches the corresponding electrical connection element (121, 122, 123).

4. An electrical accessory (100) according to claim 3, wherein each mounting means includes a housing (152; 252) with two inside faces (153, 154; 253, 254) that face towards each other, of which a first inside face (153; 253) matches a corresponding face of the electrical connection element (121; 122; 123), and a second inside face (154; 254), that includes at least one curved portion (155; 255), is suitable for pushing the electrical connection element (121, 122, 123) against said first inside face (154; 254).

5. An electrical accessory according to claim 2, wherein said mounting means are a means for mounting by clipping onto the corresponding electrical connection element.

6. An electrical accessory (100) according to claim 1, wherein said support element (150; 250) comprises at least one first branch (150; 260) with two opposite ends, each provided with mounting means for mounting on a respective one of the electrical connection elements (121, 122, 123).

7. An electrical accessory according to claim 1, wherein, in a central portion, said support element (150; 250) includes an orifice (156; 256) that is suitable for receiving said temperature sensor (200).

8. An electrical accessory (100) according to claim 1, wherein the body (110) houses three electrical connection elements (121, 122, 123), and wherein the support element (150; 250) housing the temperature sensor (200) is placed in contact with the three electrical connection elements (121, 122, 123).

9. An electrical accessory (100) according to claim 1, wherein said support element (250) presents a section that is T-shaped, with a first branch (260) that is provided with two opposite ends, including mounting means for mounting on two first electrical connection elements (121, 122), and a second branch (270) that extends between said first branch (260) and the third electrical connection element (123).

10. An electrical accessory (100) according to claim 1, wherein said support element (150, 250) includes mounting means for mounting on the electrical connection element (121) connected to the line, and on the electrical connection element (122) connected to the neutral.

11. An electrical accessory (100; 100') according to claim 1, wherein said electrical sensor is a thermistor (200).

12. An electrical accessory (100; 100') according to claim 1, wherein said support element (150; 250; 350) is made of a polymer material containing ceramic particles.

13. An electrical accessory (100; 100') according to claim 1, wherein the material used to make the support element (150; 250; 350) presents thermal conductivity that is greater than or equal to 10 W/m²·K.

14. An electrical accessory (100) according to claim 1, wherein said electrical accessory is an electric plug (100) including two electrical connection pins (131, 132) projecting from a front outside face (111A) of the body (110), each being electrically connected inside the body (110) to a respective one of said electrical connection elements (121, 122, 123).

15. An electrical accessory (100') according to claim 1, wherein said electrical accessory is an electric plug (100') including two electrical connection pins (131', 132') projecting from a front outside face (111'A) of the body (110'), each being extended inside the body by a stem that forms one of said electrical connection elements (121', 122') for receiving a conductive portion (115'A, 115'B) of an electrical conductor (114'A, 114'B), and wherein said support element (350) has said pins (131', 132') passing therethrough, such that it constitutes a pin support.

16. An electrical accessory (100') according to claim 15, wherein said support element (350) is generally in the form of a plate that is perforated with two orifices through which said pins (131', 132') are force fitted, the plate presenting a front face (350A) that is adjacent to the rear inside face (111'B) of the front wall (111') of the body (110'), and an opposite rear face (350B) from which said stems (121', 122') of the pins (131', 132') emerge.

17. An electrical accessory (100') according to claim 16, wherein the rear face (350B) of the support element (350) includes at least one projecting rib (351, 352, 353) that defines at least one reception housing for receiving a temperature sensor (200).

18. An electrical accessory (100') according to claim 1, wherein the support element (350) includes snap-fastener means for snap-fastening a support card of a printed circuit (400) to which each temperature sensor (200) is electrically connected.

* * * * *